Patented Oct. 15, 1940

2,218,344

UNITED STATES PATENT OFFICE 2,218,344

MANUFACTURE OF CONDENSATION PRODUCTS FROM PHENOLS

Reginald John William Reynolds and Eric Everard Walker, Blackley, Manchester, England, assignors to Imperial Chemical Industries Limited, a corporation of Great Britain No Drawing. Application December 27, 1938, Serial No. 247,944. In Great Britain January 3, 1938

9 Claims. (Cl. 260—286)

This invention relates to the manufacture of condensation products from substituted phenols. More particularly it relates to the conversion of substituted phenols into new water-soluble compounds which are useful as assistants in the dyeing of cellulose fabrics and are believed to be quaternary ammonium salts.

It is known to obtain water-soluble products, believed to be quaternary ammonium compounds, by causing an aqueous formaldehyde solution saturated with gaseous hydrogen halide to react with a phenol or a homologue of a phenol, the so obtained halogenomethyl phenols being subsequently reacted with pyridine.

It is also known to obtain quaternary ammonium compounds by causing an aqueous solution of formaldehyde saturated with hydrogen chloride to react with a phenol containing one or more aliphatic carbon chains, which contain at least 4 carbon atoms, the so obtained reaction product being subsequently treated with a tertiary base, such as for example, pyridine or quinoline.

These processes suffer from the disadvantage that phenol formaldehyde resins are apt to form during the reaction. Furthermore, it does not seem possible by this procedure to introduce more than one halogen-methyl group into each phenol radical. The resulting quaternary compound, therefore, cannot have more than one methylene-ammonium radical per phenol radical.

This invention has as an object to devise a new method of manufacturing condensation products from substituted phenols which will be useful as assistants in the dyeing of cellulose fabrics. A further object is to devise such a method which will not be accompanied by a wasteful formation of phenol formaldehyde resins. A still further object is to devise a method which is capable of introducing more than one methylene ammonium radical into each phenol radical, and especially two such methylene ammonium radicals, thereby leading to novel quaternary compounds. Further objects will appear hereinafter. These objects are accomplished by the following invention.

We have now found that water-soluble compounds, which are believed to be quaternary ammonium salts, are obtained by a process which comprises reacting a substituted phenol, as hereinafter defined, with a salt of a heterocyclic tertiary amine for example, pyridine, a C-alkylpyridine or quinoline, and/or with an addition compound of the said heterocyclic tertiary amine and an inorganic acid anhydride.

According to the invention we cause to interact a salt and/or an inorganic acid anhydride addition compound of a heterocyclic tertiary amine (for example, pyridine, a C-alkylpyridine, or quinoline) and a phenol which is substituted by one or more hydroxymethyl groups and which may be further substituted, either in the nucleus or in a side chain, by one or more of the following atoms or groups, namely halogen atoms, acylamido, acylamidomethyl, alkyl, aralkyl or hydroxyaralkyl groups (which last mentioned groups themselves may carry hydroxymethyl groups as substituents) and in which the hydroxymethyl group or groups is or are in the positions o and/or p to the phenolic hydroxyl or hydroxyls.

If desired, the tertiary amine salt may be made in situ, as, for example, by passing hydrochloric acid gas into a mixture of the tertiary amine and the substituted phenol or into a solution or suspension of these compounds in an inert solvent or diluent.

In carrying the invention into practical effect the reactants are heated together, usually in such proportions that one equivalent of the amine derivative is taken for each carbinol group present in the substituted phenol. For example, one molecular proportion of p-cresol dialcohol is treated with 2 molecular proportions of pyridine hydrochloride. However, larger or smaller proportions of the amine derivative may likewise be used.

Combination may be facilitated, in some cases, by carrying out the reaction under reduced pressure.

If desired, the reaction may be carried out in the presence of solvents or diluents. For instance, it is advantageous in some cases to start the reaction using toluene as a solvent or diluent and at a later stage to distil off some or all of the toluene; this forms an azeotropic mixture with the water which is liberated in the course of the reaction and thus aids in its removal and facilitates the completion of the reaction.

The substituted phenols which are used as starting materials may conveniently be made by causing formaldehyde to react with a suitable phenol in the presence of an alkaline condensing agent. By choice of suitable proportions of formaldehyde, it is possible to introduce into the phenol radical one or two methylol radicals.

The following examples, in which parts are by weight, illustrate but do not limit the invention.

Example 1

Dry hydrochloric acid gas is passed into a cooled mixture of 88 parts of p-cresol dialcohol, 84 parts of pyridine and 300 parts of dry toluene until the weight of the mixture has increased by 36 parts. The mixture is then stirred and heated to 95° C. for 2 hours. The toluene is distilled off under reduced pressure and the residue is heated for 5 hours at 95° C. under 15 mm. pressure. On cooling, a hard yellow cake is obtained which is broken up and recrystallised from ethanol. There are thus obtained 130 parts of a white crystalline substance which is very soluble in cold water and has M. P. 279°–281° C. The product gives analyses corresponding to the formula

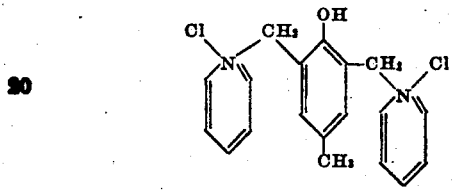

Example 2

42 parts of p-tert-butylphenol dialcohol, 46 parts of pyridine hydrochloride and 150 parts of toluene are stirred and heated at 95° C. for 2 hours. The toluene is then distilled off under reduced pressure and the residue is heated for 8 hours at 95° C. under 15 mm. pressure. On cooling a solid is obtained which is recrystallised from ethanol to give a white powder which has M. P. 262° C. and is exceedingly soluble in water. The product gives analyses corresponding to the formula

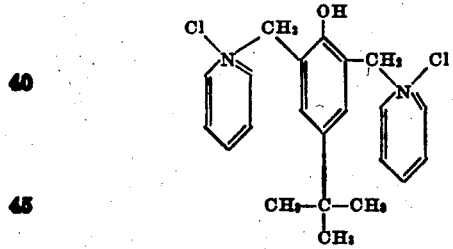

Example 3

Dry hydrochloric acid gas is passed into a mixture containing 79 parts of pyridine and 87 parts of toluene until the weight of the mixture has increased by 36 parts. 84 parts of o-cresol dialcohol are then added, and the mixture is stirred and heated at 100° C. for 2 hours. The toluene is distilled off under reduced pressure and the residue heated in vacuo at 95° C. for 6 hours. A yellow resinous mass is obtained which is dissolved in methanol, and a sufficiency of acetone is added to the methanol solution to cause crystallisation. A white crystalline mass is obtained, which is filtered off, washed with acetone and dried. The produce is completely soluble in cold water and has M. P. 78° C., but is not easily purified by recrystallising. Conversion to the picrate gives a product M. P. 178–9° C. which gives analyses corresponding to the formula

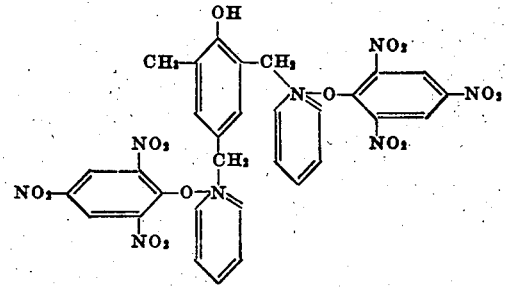

Example 4

168 parts of p-cresol dialcohol, 259 parts of α-picoline hydrochloride are added to 870 parts of toluene and the mixture is heated at 95° C. for 2 hours. The toluene is distilled off under reduced pressure and the residue heated in vacuo at 95° C. for 16 hours. The so obtained pale yellow syrup is dissolved in water, allowed to stand and the white, water-soluble, crystalline mass which deposits is collected. The product has no definite M. P. (decomp. 225° C.) and gives analyses corresponding to the following formula

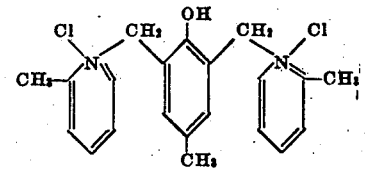

When the procedure of this example is repeated, using pyridine nitrate instead of α-picoline hydrochloride, a dark yellow viscous mass is obtained, which is soluble in water, forming a clear brown solution, which does not deposit a crystalline solid on standing.

Example 5

168 parts of p-cresol dialcohol and 502 parts of pyridine-p-toluene sulphonate are mixed and heated at 110° C. for 2 hours, and then at 95° C. in vacuo for 16 hours, the water formed during the reaction distils away rapidly and, after cooling, a pale yellow viscous syrup is obtained. The syrup dissolves easily in cold water, forming a slightly opalescent solution. It has the probable formula

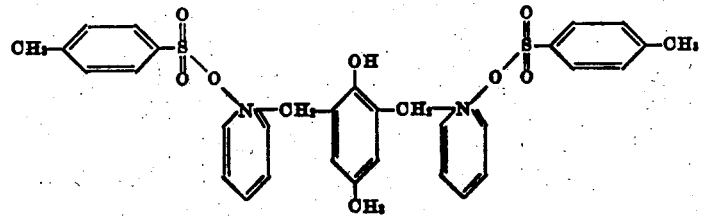

Example 6

33 parts of p-cresol dialcohol are dissolved in 100 parts of pyridine and sulphur dioxide is passed into the solution heated at 80° C. until a reaction product is obtained which is completely soluble in water. Acetone is added to the pyridine solution and the product is precipitated as a brown, water-soluble, viscous syrup.

Example 7

42 parts of pyridine are dissolved in 132 parts of toluene, dry hydrochloric acid gas is passed into the solution until an increase in weight of 18.5 parts is obtained, 44 parts of p-cresol dialcohol are added and the mixture is stirred at a temperature of 100° C. for 2 hours. The toluene is distilled off at a temperature of 140° C., and the mixture maintained at 140° C. for 16 hours under conditions whereby the water formed in the reaction is removed. A yellow crystalline mass is obtained which is crystallised from ethanol giving a product identical with that described in Example 1.

*Example 8*

149 parts of a carbinol prepared from technical dodecylphenol, are stirred together with 107 parts of pyridine hydrochloride and 150 parts of toluene at 95° C. for 1 hour, whereby a clear solution is obtained. The toluene is then distilled off under reduced pressure and the residue is heated for 8 hours at 95° C. under a pressure of 15 mm. There is thus obtained a brown viscous oil which is readily and completely soluble in water. It has the probable formula

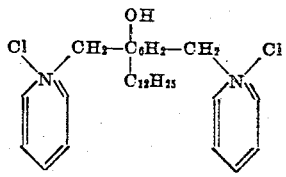

in which the $C_{12}H_{25}$ and the two $CH_2$'s occupy positions o- and p- to the OH group.

The carbinol used in this example may be prepared as follows. 131 parts of technical dodecylphenol are stirred into 100 parts of water containing 25 parts of caustic soda and 100 parts of a 37% aqueous solution of formaldehyde are then added. The mixture is cooled by surrounding the container with a vessel of cold water and stirred for 22 hours. Both the dodecylphenol and the reaction product are incompletely soluble in the reaction medium so that the liquid has the form of an emulsion. Saturated brine is then added to cause the oil to collect together. The liquid is allowed to separate into two layers and the aqueous layer is rejected. The oily liquid is washed by repeated shaking with saturated brine and is then neutralized by shaking with a sufficiency of 20% aqueous acetic acid. The emulsion so obtained is shaken with toluene and the toluene solution of the oil is separated off. This solution is well washed with water and dried over anhydrous magnesium sulphate. The toluene is then distilled off, whereby the carbinol is obtained as a brown oil.

*Example 9*

156 parts of a carbinol prepared from technical octadecylphenol, 88.5 parts of pyridine hydrochloride and 150 parts of toluene are stirred together at 95° C. for 2 hours whereby a clear solution is obtained. The toluene is then distilled off under reduced pressure and the residue is heated for 6 hours at 95° C. under a pressure of 15 mm. There is thus obtained a brown, viscous oil which is readily soluble in water. It has the probable formula

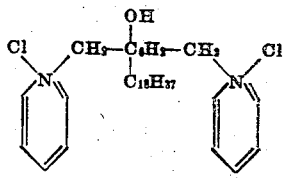

in which the $C_{18}H_{37}$ and the two $CH_2$ occupy positions o- and p- to the OH group.

The carbinol used in this example may conveniently be prepared as follows. 138 parts of technical octadecylphenol are mixed with a solution of 20 parts of caustic soda in 130 parts of water and 80 parts of a 37% aqueous solution of formaldehyde are then added. The mixture is cooled (by surrounding the containing vessel with a bath of cold water) and stirred at room temperature for 24 hours whereby an emulsion is formed. Saturated brine is then added to break the emulsion and the liquid is allowed to separate into two layers. The oily layer is removed, neutralised by shaking with 20% aqueous acetic acid and again separated off. It is then dissolved in toluene and the solution is washed by shaking with a further quantity of brine. The toluene solution of the oil is separated off and dried over anhydrous magnesium sulphate. The toluene is then distilled off under reduced pressure, whereby the carbinol is obtained as a brown oil.

*Example 10*

30 parts of p-chlorophenol dialcohol and 37 parts of pyridine hydrochloride are suspended in 150 parts of dry toluene and stirred at 95° C. for 2 hours. The toluene is distilled off under reduced pressure at 80° C. and the viscous yellow oil then remaining is heated for 18 hours at 95° C. under 15 mm. pressure. On cooling, a crystalline solid is obtained. This is recrystallised from ethanol to give a white crystalline substance which is readily soluble in water and melts at a temperature above 350° C. It has the probable formula

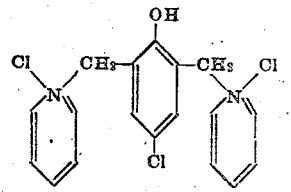

The dialcohol used in this example may be conveniently prepared as follows: 43 parts of p-chlorophenol are dissolved in 66 parts of water containing 17.5 parts of sodium hydroxide and 67.5 parts of a 37% aqueous solution of formaldehyde are added. The mixture is stirred at room temperature for 48 hours. Crystals separate out and are filtered off. They are then dissolved in 700 parts of water and the solution is neutralised by the addition of a 20% aqueous solution of acetic acid. p-Chlorophenol dialcohol is precipitated in the form of a crystalline mass. This is filtered off, washed with brine and dried at 30° C. It then has M. P. 158°–159° C.

*Example 11*

35 parts of diphenylolpropane tetraalcohol (which may be prepared by condensing diphenylolpropane with formaldehyde in the presence of caustic soda) and 47 parts of pyridine hydrochloride are mixed with 300 parts of toluene and heated to 90° C. for 2 hours. The toluene is then distilled off under reduced pressure at 90° C. and the residue is heated for 18 hours at 95° C. under 15 mm. pressure. There is thus obtained a brittle yellow resinous solid which is soluble in water and is believed to be the quaternary salt.

*Example 12*

55 parts of methylolstearamidomethylphenol (prepared by treating stearamidomethylphenol with paraformaldehyde and potassium carbonate in the presence of benzene) are dissolved in 900 parts of toluene and 28.5 parts of pyridine hydrochloride are added. The mixture is stirred at 95° C. for 2 hours, the solvent removed by distillation in vacuo at 80° C. and the residue heated at a temperature of 95° C., in vacuo for 6 hours. There is thus obtained a waxy solid which dissolves in water forming a faintly opalescent solution, which foams on shaking. It has the probable formula

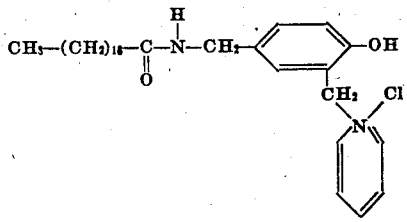

Example 13

38 parts of p-chlorophenol dialcohol, 51.2 parts of pyridine sulphite and 45 parts of toluene are heated at 95° C. for 2 hours, the toluene is removed by distillation in vacuo, and the mixture maintained at 100° C. for 24 hours. There is thus obtained a brown, viscous mass, which is readily soluble in water.

The water-soluble compounds obtained according to the process of the invention are believed to be quaternary ammonium salts, the structure of which is illustrated by the following equation which represents the formation of a typical salt, 4-methyl-2:6-(dimethylidopyridinium chloride)-phenol, from p-cresol dialcohol and pyridine hydrochloride

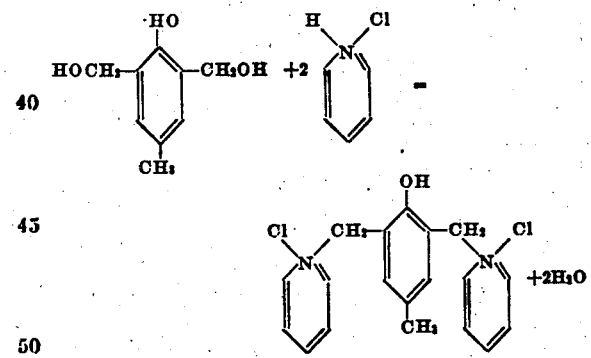

As substituted phenols suitable to be used for the process of the present invention there may be mentioned, for example, o-hydroxybenzyl alcohol, p-cresol, dialcohol (2-hydroxy-3-hydroxymethyl-5-methylphenyl carbinol), o-cresol dialcohol (2-hydroxy-3-methyl - 5 - hydroxymethylphenol carbinol), p-tert-butylphenol dialcohol (2-hydroxy-3-hydroxymethyl-5-tert-butylphenyl carbinol), dodecylphenol carbinol, octadecylphenol carbinol, stearamidomethylphenol carbinol, p-chlorophenol dialcohol (2-hydroxy-3-hydroxymethyl - 5 - chlorophenyl carbinol), diphenylolmethane tetraalcohol (4:4'-dihydroxy-3:5:3':5'-tetrahydroxymethyldiphenylmethane), di-o-cresylolmethane dialcohol (3:3'-dimethyl-4:4'-dihydroxy - 5:5' - dihydroxymethyl-diphenylmethane), diphenylolpropane tetraalcohol and di-o-cresylolpropane dialcohol.

As suitable tertiary amine salts there may be mentioned, for example, the halides, sulphites, nitrates, m-nitrobenzene sulphonates or p-toluene sulphonates of pyridine, a C-alkylpyridine or quinoline and also addition compounds of these tertiary amines with inorganic acid anhydrides, for example, sulphur dioxide or sulphur trioxide. As particularly suitable tertiary amine salts, there may be mentioned the hydrochlorides of pyridine and α-picoline.

This invention is a valuable advance in the art as it discloses a simple method of making useful assistants for dyeing cellulosic fibres. This process for obtaining watersoluble compounds shows advantage over the known processes in that interaction of a phenol with formaldehyde, in the presence of acid, is avoided and the undesirable formation of phenol-formaldehyde resins is thereby minimised or completely prevented. Furthermore, this method enables one to produce a series of novel quaternary compounds, characterized by having two methylene-ammonium radicals attached to each phenol radical.

As many apparently widely different embodiments of this invention may be made without departing from the spirit and scope thereof, it is to be understood that the invention is not limited to the specific embodiments thereof except as defined in the appended claims.

We claim:
1. A process for the manufacture of water-soluble compounds, which comprises interacting a phenol having at least one hydroxymethyl substituent in ortho position, with a compound selected from the group consisting of the addition products of acids and acid anhydrides with pyridine, the C-alkyl pyridines and quinoline.

2. A process for the manufacture of water-soluble compounds, which comprises interacting a phenol having at least one hydroxymethyl substituent in ortho position and at least one further substituent selected from the group consisting of halogen, acylamido, acylamidomethyl, alkyl, aralkyl and hydroxyaralkyl, with a compound selected from the group consisting of the addition products of acids and acid anhydrides with pyridine, the C-alkyl pyridines and quinoline.

3. A process for the manufacture of water-soluble compounds, which comprises interacting a di-hydroxymethyl phenol with a compound selected from the group consisting of the addition products of acids and acid anhydrides with pyridine, the C-alkyl pyridines and quinoline.

4. A process for the manufacture of water-soluble compounds, which comprises interacting an ortho, ortho'-di(hydroxymethyl)-phenol with a compound selected from the group consisting of the addition products of acids and acid anhydrides with pyridine, the C-alkyl pyridines and quinoline.

5. Quaternary salts of the general formula HO—Ar=(CH$_2$—Ntert—X)$_2$, wherein Ar is an aryl radical of the benzene series, Ntert stands for the nucleus of a cyclic tertiary base selected from the group consisting of pyridine, the C-alkyl pyridines and quinoline, while X stands for an anionic radical, and wherein the radicals (CH$_2$—Ntert—X) occupy positions in the Ar nucleus other than meta to the OH group.

6. A quaternary salt of the general formula

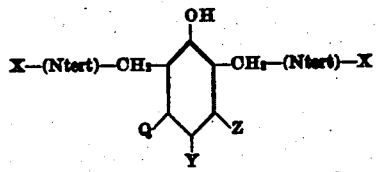

wherein X is anionic radical, (Ntert) stands for the nucleus of a cyclic tertiary base selected from the group consisting of pyridine, the C-alkyl pyridines and quinoline, while Q, Y, Z stand for substituents selected from the group consisting of hydrogen, halogen, acylamido, acylamidomethyl, alkyl, aralkyl and hydroxy-aralkyl.

7. A quaternary salt of the general formula

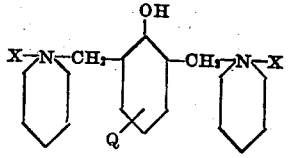

wherein X stands for the anion of a mineral acid while Q stands for a substituent selected from the group consisting of hydrogen, halogen, acylamido, acylamidomethyl, alkyl, aralkyl and hydroxy-aralkyl.

8. A quaternary salt of the general formula

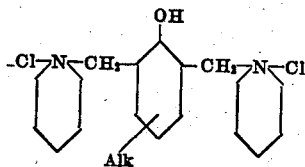

wherein Alk stands for an alkyl radical having not less than 8 carbon atoms in its structure.

9. A process for producing a quaternary ammonium compound, which comprises reacting with formaldehyde and alkali upon a phenol of the general formula

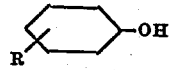

wherein R is an alkyl radical having not less than 8 carbon atoms, to produce an intermediate hydroxy-phenyl-carbinol compound of the general formula

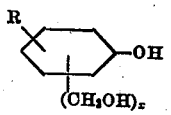

wherein R has the same significance as above, while $x$ is an integer less than 3, and then condensing said intermediate hydroxy-phenyl-carbinol compound with a compound selected from the group consisting of the addition products of acids and acid anhydrides with pyridine, the C-alkyl-pyridines or quinoline.

REGINALD JOHN WILLIAM REYNOLDS.
ERIC EVERARD WALKER.